(12) United States Patent
Coborn

(10) Patent No.: US 11,087,294 B2
(45) Date of Patent: *Aug. 10, 2021

(54) WI-FI MANAGEMENT AND MONETIZATION SYSTEM AND METHOD

(71) Applicant: Thomas Coborn, Naples, FL (US)

(72) Inventor: Thomas Coborn, Naples, FL (US)

(73) Assignee: Thomas Coborn, Naples, FL (US)

(*) Notice: Subject to any disclaimer, the term of this patent is extended or adjusted under 35 U.S.C. 154(b) by 105 days.

This patent is subject to a terminal disclaimer.

(21) Appl. No.: 16/590,136

(22) Filed: Oct. 1, 2019

(65) Prior Publication Data

US 2020/0234255 A1 Jul. 23, 2020

Related U.S. Application Data

(63) Continuation-in-part of application No. 16/252,196, filed on Jan. 18, 2019, now Pat. No. 10,430,768.

(51) Int. Cl.
*G06Q 20/34* (2012.01)
*G06Q 20/04* (2012.01)
*H04L 29/08* (2006.01)

(52) U.S. Cl.
CPC ........... *G06Q 20/045* (2013.01); *G06Q 20/34* (2013.01); *H04L 67/02* (2013.01)

(58) Field of Classification Search
USPC .............................................. 705/1.1, 35, 39
See application file for complete search history.

(56) References Cited

U.S. PATENT DOCUMENTS

| | | | |
|---|---|---|---|
| 9,973,547 B1* | 5/2018 | Simms | H04L 67/2842 |
| 2007/0192246 A1* | 8/2007 | Futamase | G06F 16/9566 |
| | | | 705/40 |
| 2007/0220596 A1* | 9/2007 | Keeler | H04W 12/088 |
| | | | 726/7 |
| 2012/0170513 A1* | 7/2012 | Vogedes | H04W 40/248 |
| | | | 370/328 |
| 2013/0079036 A1* | 3/2013 | Sharet | H04W 4/21 |
| | | | 455/456.3 |
| 2014/0165180 A1* | 6/2014 | Sauther | H04W 12/069 |
| | | | 726/10 |
| 2014/0179231 A1* | 6/2014 | Charania | G07F 9/001 |
| | | | 455/41.2 |
| 2014/0188581 A1* | 7/2014 | Hutchison | G06Q 30/0252 |
| | | | 705/14.5 |

(Continued)

Primary Examiner — William E Rankins
(74) Attorney, Agent, or Firm — Mark Terry

(57) ABSTRACT

A system for monetizing an Internet connection comprises a router communicably coupled with the Internet for receiving a request from a client computing device to connect to the router for Internet access and redirecting to a first URL, a hosting server for serving a page that includes ads and an Internet connection confirmation widget that redirects to a second URL, an Internet connection management server configured for: serving pages to the client computing device providing the following options: 1) a free session of access to the Internet without requiring the client user to provide identifying information, 2) a paid session of access to the Internet, and 3) a paid voucher session of access to the Internet without requiring the client user to provide identifying information, and granting access to the Internet to the client computing device, according to the option selected by the client user via the pages.

20 Claims, 6 Drawing Sheets

(56) References Cited

U.S. PATENT DOCUMENTS

| | | | |
|---|---|---|---|
| 2015/0012970 A1* | 1/2015 | Toksvig | H04L 63/0815 |
| | | | 726/3 |
| 2016/0285841 A1* | 9/2016 | Marcy | H04W 12/068 |
| 2017/0201518 A1* | 7/2017 | Holmqvist | G06F 21/34 |
| 2018/0109948 A1* | 4/2018 | Huber | H04W 8/082 |
| 2019/0075457 A1* | 3/2019 | Canpolat | H04W 12/065 |

\* cited by examiner

WI-FI MANAGEMENT AND MONETIZATION SYSTEM AND METHOD

CROSS-REFERENCE TO RELATED APPLICATIONS

This application is a continuation-in-part of U.S. Non-Provisional patent application Ser. No. 16/252,196 entitled "Wi-Fi Management and Monetization System and Method," filed Jan. 18, 2019, the subject matter all of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The technical field relates generally to network connectivity and, more specifically, to processes for monetizing network connectivity in public and private places.

BACKGROUND

Public Wi-Fi hotspots have become ubiquitous in developed countries and have started to increase in popularity in the developing world. Globally, total public Wi-Fi hotspots are predicted to grow sevenfold from 2015 to 2020, from 64.2 million in 2015 to 432.5 million by 2020. Additionally, consumers are beginning to expect the availability of public Wi-Fi hotspots. Travelers, for example, are expecting free public Wi-Fi hotspots as an essential to their stay and liken it to being as necessary as being able to take a shower. Recent travel surveys found that 94% of consumers cite free public Wi-Fi as the most important amenity.

One of the greatest drawbacks associated with providing free public Wi-Fi hotspots to consumers is the associated cost. Public Wi-Fi hotspots requiring a network connection, which usually presents a fixed monthly cost, as well as maintenance and hardware expenditures. There is also the expenditure associated with the initial setup of the network connection. At a time when many businesses are looking to lower their costs in order to increase profitability, it can be difficult for certain businesses to justify the cost associated with purchasing, setting up and maintaining a free public Wi-Fi hotspot.

Another significant issue is that public Wi-Fi hotspots require users to input identifying information into an interface to access the Internet, including for example, but not limited to, the user's name, address, e-mail address, and telephone number. Recent studies have found that many people are becoming more suspicious and less comfortable with sharing identifying information with third parties. Particularly, people are generally unwilling to share identifying information due to concerns regarding the invasion of privacy, location tracking, phishing, and unsolicited emails.

One solution to this problem that has become popular among business owners is to set up a system that requires end users pay for the network connection. Typically, this solution entails programming the system (including the router and/or connected access points) to present the end user, upon initial connection, with a page that requires the user must enter electronic payment information (such as credit card information) into an interface. After the system processes payment, the system then manages the Internet connection. Thus, in order to effectuate this solution, the business entity must build a payment gateway, an authentication and authorization system, and an Internet connection management system. The aforementioned system, however, is complicated to set up and expensive to build and maintain.

Therefore, a need exists for improvements over the prior art, and more particularly for more efficient methods and systems for providing free public Wi-Fi hotspots to consumers.

SUMMARY

A system for monetizing a network connection is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for monetizing an Internet connection comprises a router communicably coupled with the Internet, the router configured for receiving a request from a client computing device to connect to the router for Internet access, and redirecting the client computing device to a first Uniform Resource Locator (URL) via the Internet connection; a hosting server located at the first URL, the hosting server configured for serving at least one page to the client computing device, wherein the at least one page includes client user-viewable ads and an Internet connection confirmation widget, wherein when the widget is activated by the client user, the hosting server redirects the client computing device to a second URL; an Internet connection management server located at the second URL, the Internet connection management server configured for: serving one or more pages to the client computing device providing the following options: 1) a free session of access to the Internet, subsequent to receiving a confirmation from the client user regarding terms and conditions via the one or more pages, wherein the client user is not required to provide identifying information to gain the free session of access to the Internet, 2) a paid session of access to the Internet, subsequent to receiving electronic payment information of the client user via the one or more pages, and 3) a paid voucher session of access to the Internet, subsequent to receiving voucher information of the client user via the one or more pages, wherein the client user is not required to provide identifying information to gain the paid voucher session of access to the Internet, and granting access to the Internet to the client computing device, according to the option selected by the client user via the one or more pages.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
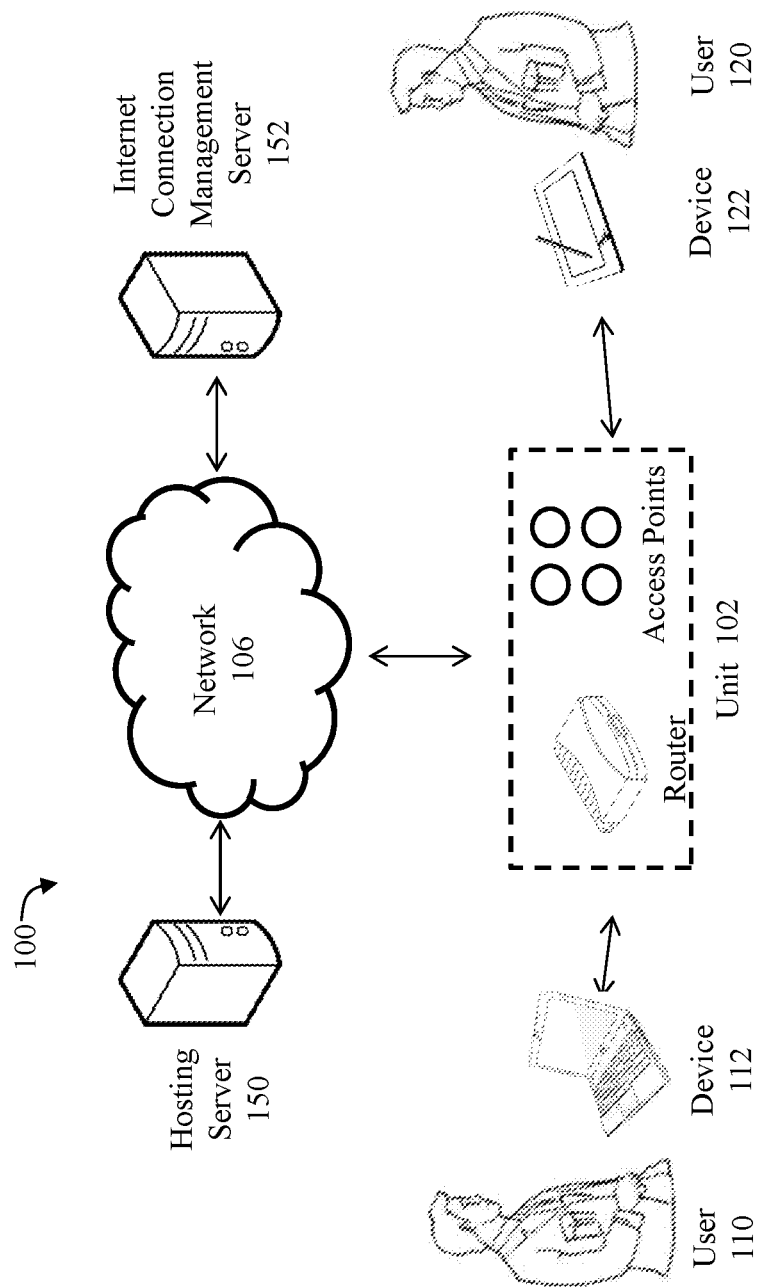
FIG. 1 is a diagram of an operating environment that supports a method and system for monetizing network connectivity, according to an example embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed embodiments improve over the prior art by providing an efficient, safe and precise way of monetizing a network connection, especially in public places. The example embodiments leverage the wide availability of publicly available network connections (such as Wi-Fi hotspots) to provide an added revenue source to the owner of the network connection. The disclosed embodiments reduce or eliminate publicly available network connections that are a cost burden on the owner of the network connection. This feature results in more safe, precise and accurate network connections in public spaces, while lowering or reducing the costs associated with owning the network connections. Additionally, the claimed embodiments improve upon the prior art because it does not require users to provide identifying information to gain access to the Internet, thus mitigating concerns regarding the invasion of privacy, location tracking, phishing, and unsolicited emails.

FIG. 1 is a diagram of an operating environment 100 that supports a system for monetizing a network connection. The unit 102 may be communicatively coupled with a communications network 106, such as the Internet, according to an example embodiment. The unit 102 may be a standalone network, comprising one or more routers, or may be an enterprise network, comprising multiple access points, as well as all necessary ancillary routers, servers, and computing devices, or any combination of the foregoing. A router is a networking device that forwards data packets between computer networks. Routers perform the traffic directing functions on the Internet. An access point is a networking hardware device that allows a Wi-Fi device to connect to a wired network. The access point usually connects to a router (via a wired network) as a standalone device, but it can also be an integral component of the router itself.

The environment 100 may comprise mobile computing devices 112, 122, which may communicate with unit 102 wirelessly. Mobile computing devices 112, 122 may comprise a cellular/mobile telephone, smart phone, tablet computer, laptop computer, handheld computer, wearable computer, or the like. Devices 112, 122 may also comprise other computing devices such as desktop computers, workstations, servers, and game consoles, for example. Communications network 106 may be a packet switched network, such as the Internet, or any local area network, wide area network, enterprise private network, cellular network, phone network, mobile communications network, or any combination of the above.

The environment 100 shows that mobile computing device 112 is operated by a user 110 and the device 112 is operated by a user 120. Unit 102 and devices 112, 122 may each comprise a computing device 600, described below in greater detail with respect to FIG. 6.

FIG. 1 also shows a hosting server 150 connected to network 106. The hosting server 150 may provide a web hosting service that is a type of Internet hosting service that allows entities to make their website and web pages accessible via the World Wide Web. FIG. 1 also shows an Internet connection management server 152 connected to network 106. Server 152 manages all of the activities and data that must be managed for each Internet connection provided to each end user, including: collecting electronic payment information, processing payment using said electronic payment information via a payment gateway, collecting voucher code information, verifying voucher code information, identifying the user, authentication of the user, authorization of the user to use the Internet connection, connection time management, etc. Connection time management is a process by which the server 152 manages the amount of time the client user has access to the Internet. If the paid session of the Internet (or the voucher paid session of the Internet) is for a limited amount of time, the connection time management process will shut down the client user's access to the Internet when the predefined amount of time has expired. If the free session of the Internet is for a limited amount of time, the connection time management process may also shut down the client user's access to the Internet when the predefined amount of time has expired, or show the client user more ads, which would start a predefined period of time. Connection time management keeps track of the amount of time the client user has utilized the Internet and acts accordingly.

Unit 102 and servers 150, 152 may include a software engine that delivers applications, data, program code and other information to networked devices, such as 112, 122. The software engine of unit 102 and servers 150, 152 may perform other processes such as transferring multimedia data in a stream of packets that are interpreted and rendered by a software application as the packets arrive. Unit 102 and servers 150, 152 may include a database or repository, which may be a relational database comprising a Structured Query Language (SQL) database stored in a SQL server.

Unit 102 and servers 150, 152 may each include program logic comprising computer source code, scripting language code or interpreted language code that perform various functions of the disclosed embodiments. In one embodiment, the aforementioned program logic may comprise program module 607 in FIG. 6. It should be noted that although FIG. 1 shows only two mobile computing devices 112, 122, and unit 102, and two servers 150, 152, the system of the disclosed embodiments supports any number of units, servers and mobile computing devices connected via network 106. Also note that although unit 102 is shown as a single and independent entity, in one embodiment, unit 102 and its functionality can be realized in a centralized fashion in one computer system or in a distributed fashion wherein different elements are spread across several interconnected computer systems. The same applies to servers 150, 152.

Figure 2:
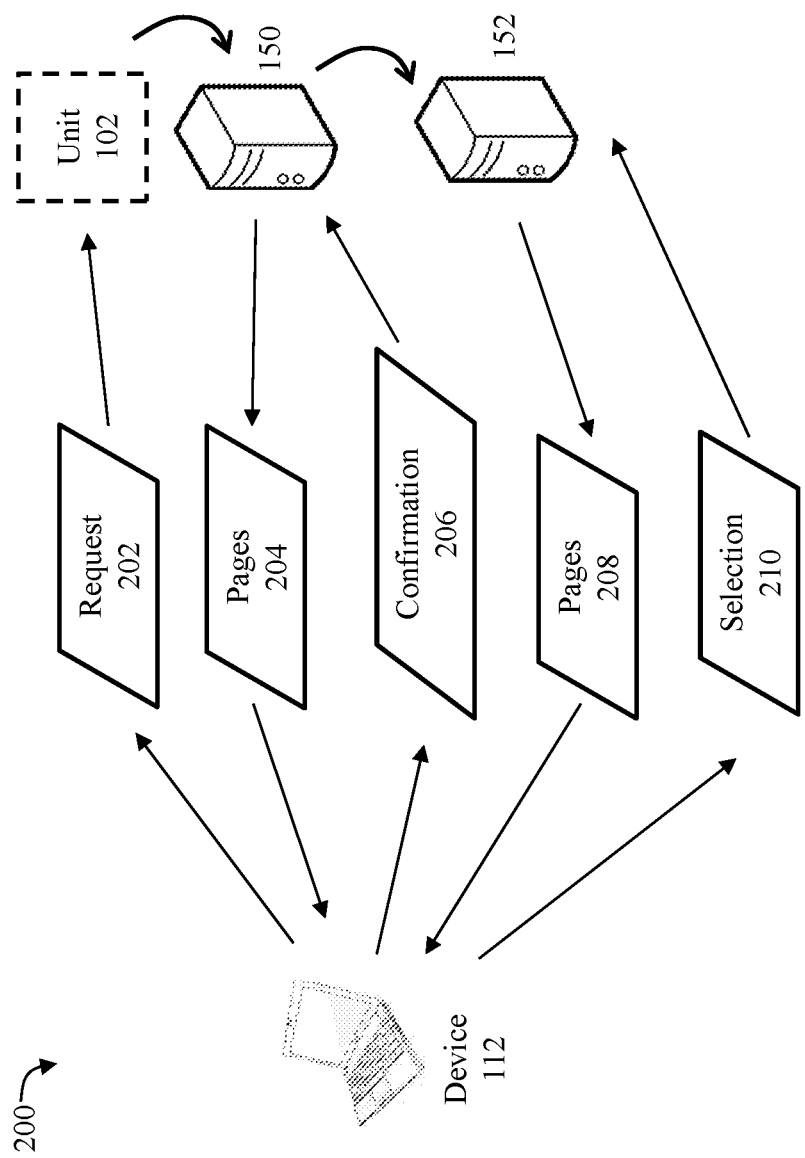
FIG. 2 is a chart showing the data flow of the process for monetizing network connectivity, according to an example embodiment.
Figure 3:
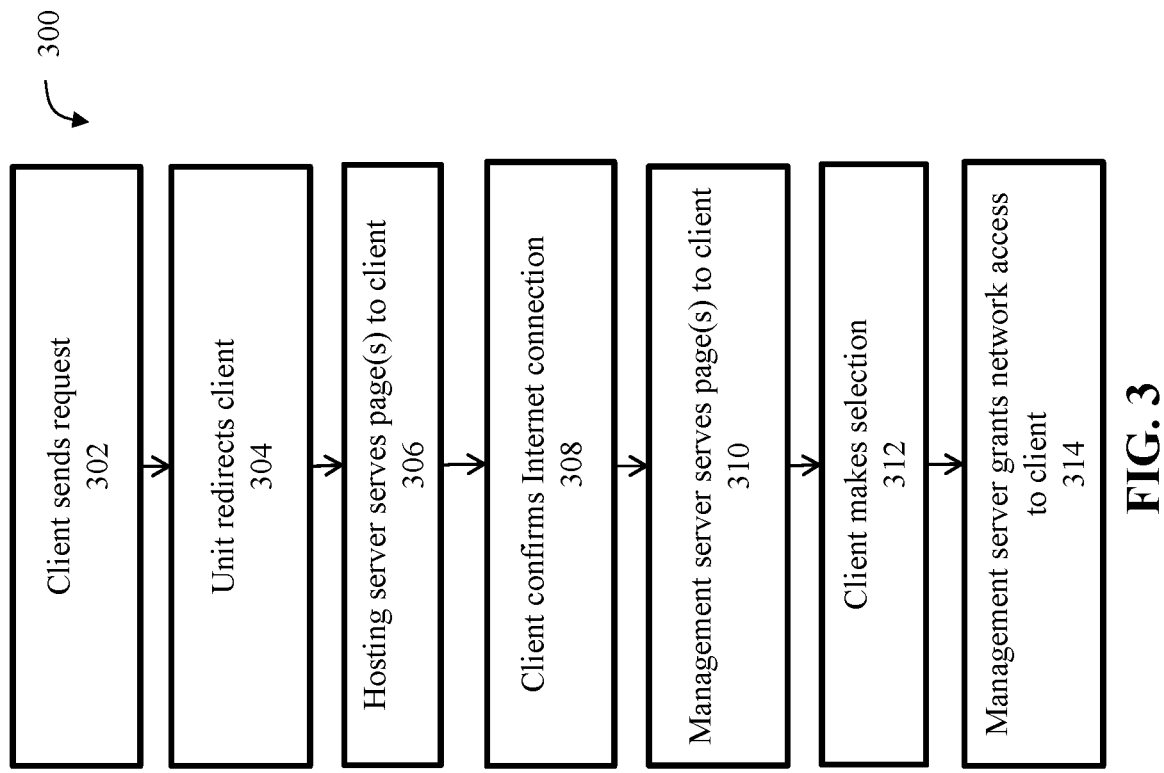
FIG. 3 is a flow chart showing the control flow of the process for monetizing network connectivity, according to an example embodiment.
Figure 4:
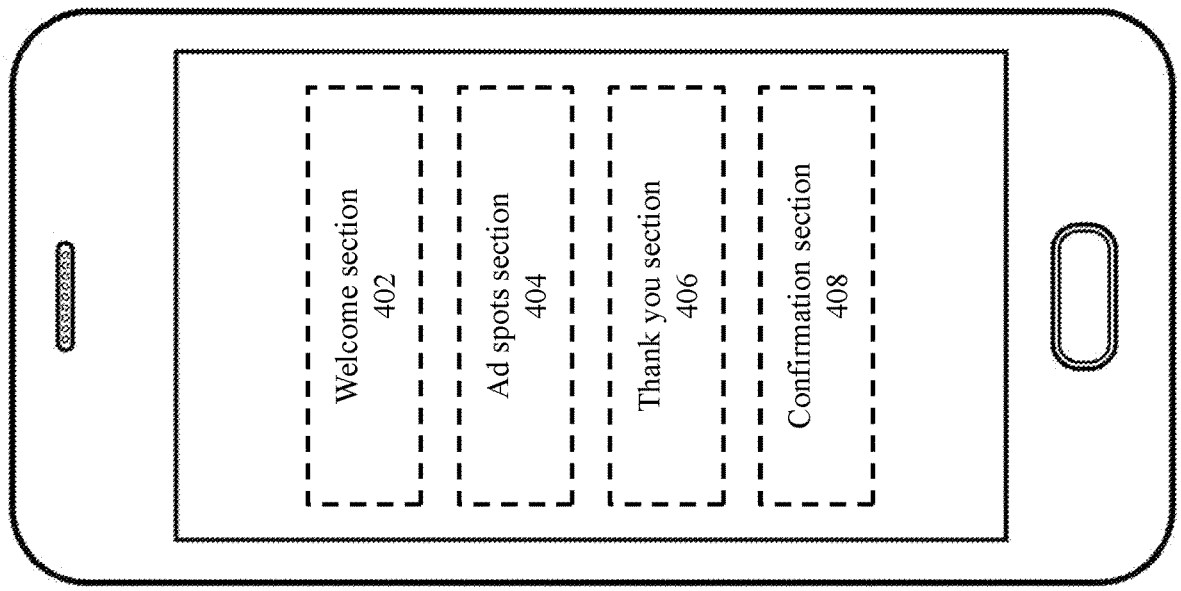
FIG. 4 is a diagram showing a mobile phone interface used in one part of the process for monetizing network connectivity, according to an example embodiment.
Figure 5:
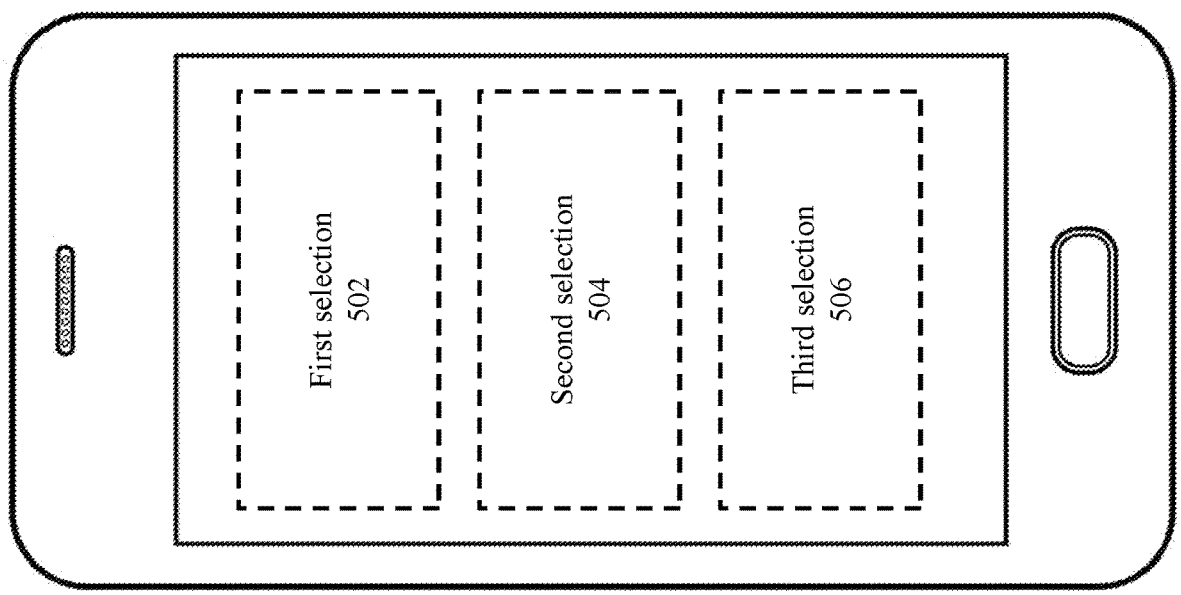
FIG. 5 is a diagram showing a mobile phone interface used in another part of the process for monetizing network connectivity, according to an example embodiment.

FIG. 3 is a flow chart showing the control flow of the process 300 for monetizing a network connection, according to an example embodiment. Process 300 describes the steps that occur when a user, such as user 110, uses his device 112 to gain a network connection via unit 102. The process 300 is described with reference to FIG. 1, as well as FIG. 2, which shows a data flow for the process 300, and FIGS. 4 and 5, which show interfaces on a mobile phone.

Process 300 starts with step 302 wherein the user 110 uses his device 112 to send a request 202, such as an HTTP request or an HTTPS request, from a browser on his client computing device 112 to the unit 102, wherein the request 202 indicates a desire to connect to the unit 102 for access to network 106, i.e., the Internet. Next, in step 304, the unit 102 redirects the client computing device 112 to a specific Uniform Resource Locator (URL) (representing hosting server 150) via the network connection.

Then, in step 306, hosting server 150 serves a page or pages 204 to the client computing device 112, wherein the page or pages 204 include client user-viewable ads 404 and an Internet connection confirmation widget 408, wherein when the widget 408 is activated by the client user, the hosting server 150 redirects the client computing device to a second URL representing the Internet connection management server 152. The widget 408 may be a button or another interface item that requires the user click on, or interact with, the widget. The page or pages 204 may also include a welcome message 402, and a thank you message 406. Thus, the page or pages 204 may comprise, for example, an interface viewable on a mobile phone that includes a welcome section 402, an ad section 404, a thank you section 406, and an Internet connection confirmation widget 408 (see FIG. 4). Ad section 404 includes ads that have been paid for by advertisers.

Then, in step 308, the client user 110 uses his device 112 to click on, or interact with, the widget 408 (or provides another type of command via a user interface on device 112) to confirm 206 his desire to move forward in obtaining a network connection. The confirmation 206 is transmitted to the server 150. In step 310, responsive to receiving the confirmation 206 from the client user 110 via the page or pages 204, the server 150 redirects the client computing device 112 to a second URL representing the Internet connection management server 152.

Next, in step 310, the Internet connection management server 152 serves a second page or pages 208 to the client computing device 112 providing the following options: 1) a free session of access to the Internet, subsequent to receiving a user interface confirmation from the client user regarding terms and conditions (selection 502), 2) a paid session of access to the Internet, subsequent to receiving electronic payment information of the client user via a user interface (selection 504), and 3) a paid voucher session of access to the Internet, subsequent to receiving voucher information of the client user via a user interface (selection 506). Thus, the second page or pages 208 may comprise, for example, an interface viewable on a mobile phone that includes a first selection section 502, a second selection section 504, and a third selection section 506 (see FIG. 5).

In step 312, the client user 110 makes a selection 210 of one of the options by clicking on a portion of the second page or pages (see FIG. 5) or providing another type of command via a user interface on device 112. In step 314, the server 152 grants access to the Internet to the client computing device 112, responsive to the selection from the client user 110 at the second page or pages via the user interface. If the user made the first selection, a new web page may open via the user interface and provide the client user with terms and conditions to access the Internet. The user is usually required to check a box that shows agreement and consent to the terms and conditions. Subsequent to receiving a user interface confirmation from the client user regarding terms and conditions, the user receives a free session of access to the Internet with viewable ads. A new web page may then open, indicating that the client user's free session of Internet access has started. The client user is then subjected to viewable ads that must be watched by the client user in order to continue the free session of Internet access. If the user made the first selection, at no point is the client user required to input identifying information to access the Internet.

If the user made the second selection, a new page may open via the user interface and provide the client user with the terms and conditions to access the Internet, as well as a form to collect the user's payment information. The user is required to check a box that shows agreement and consent to the terms and conditions as well as input the required payment information details on the form. Subsequent to receiving confirmation from the client user regarding terms and conditions and electronic payment information of the client user via a user interface, the user receives a paid session of access to the Internet without viewable ads. A new web page may then open, indicating that the client user's paid and ad-free session of Internet access has started. It is important to note that if the client user is unwilling to share identifying information due to concerns regarding the invasion of privacy, location tracking, phishing, and unsolicited emails, the client user can choose among the first selection or third selection because neither selection requires the client user to provide identifying information to gain access to the Internet.

If the user made the third selection, a new page will open via the user interface and provide the user with the terms and conditions to access the Internet, as well as a form to collect voucher code information. The user is required to check a box that shows agreement and consent to the terms and conditions as well as input the required voucher code information on the form. Subsequent to receiving confirmation from the client user regarding terms and conditions and voucher information of the client user via a user interface, the user receives a paid voucher session of access to the Internet without viewable ads. A new web page may then open, indicating that the client user's paid voucher and ad-free session of Internet access has started. If the user made the third selection, at no point is the client user required to input identifying information to access the Internet.

Figure 6:
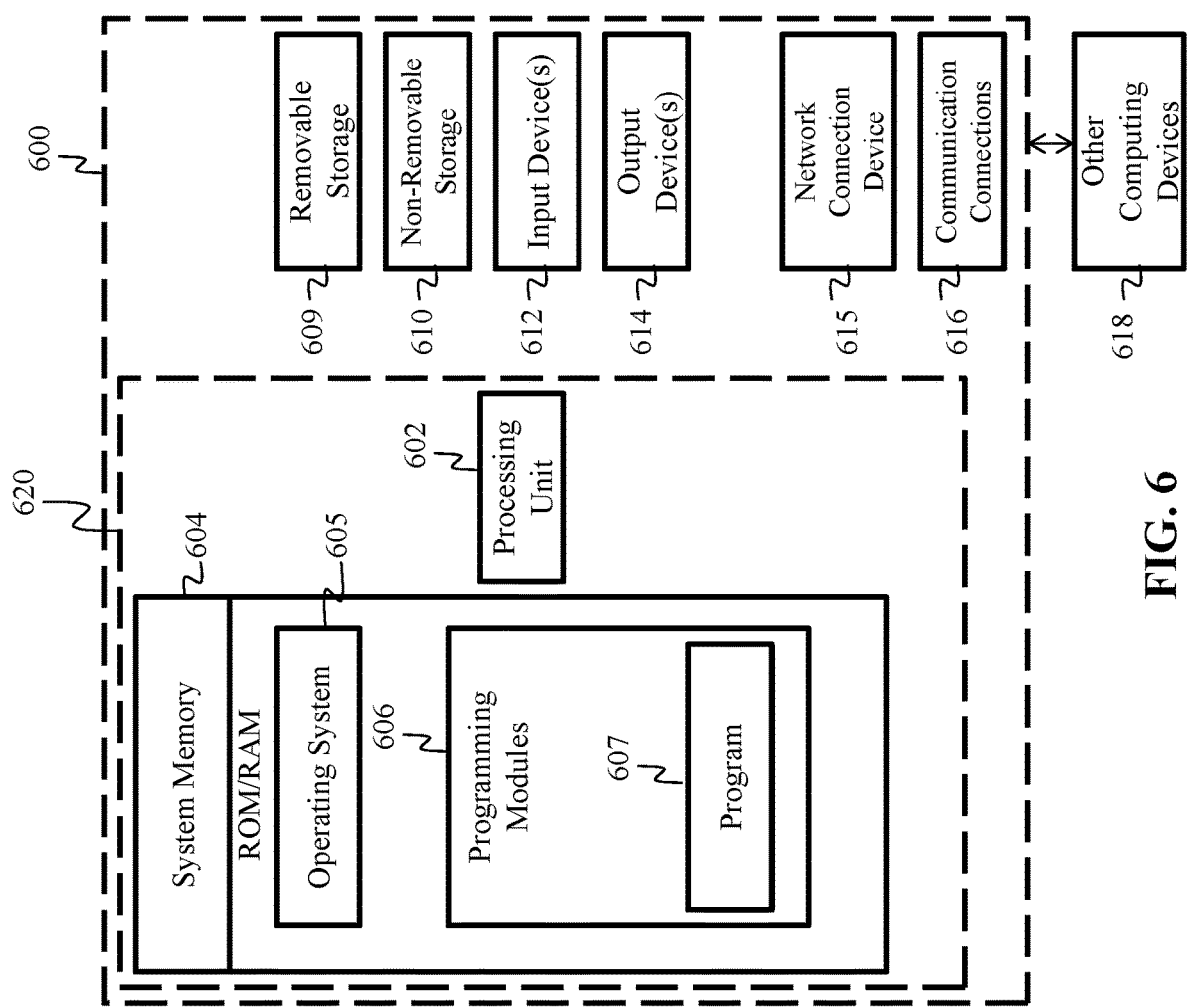
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by unit 102, and devices 150, 150 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of unit 102, and devices 150, 152. Furthermore, certain embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 300 as described above. The aforementioned processes are examples, and processing unit 602 may perform other processes. Other programming modules that may be used in accordance with certain embodiments may include electronic mail and contacts applications, word processing applications, spreadsheet applications, database applications, slide presentation applications, drawing or computer-aided application programs, etc.

Generally, consistent with certain embodiments of, program modules may include routines, programs, components, data structures, and other types of structures that may perform particular tasks or that may implement particular abstract data types. Moreover, embodiments may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Certain embodiments may also be practiced using other technologies capable of performing logical operations such as, for example, AND, OR, and NOT, including but not limited to mechanical, optical, fluidic, and quantum technologies. In addition, embodiments may be practiced within a general-purpose computer or in any other circuits or systems.

Embodiments, for example, are described above with reference to block diagrams and/or operational illustrations of methods, systems, and computer program products according to certain embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for monetizing an Internet connection, the system comprising:
a router communicably coupled with the Internet, the router configured for receiving a request from a client computing device to connect to the router for Internet access, and redirecting the client computing device to a first Uniform Resource Locator (URL) via the Internet connection;
a hosting server located at the first URL, the hosting server configured for serving at least one page to the client computing device, wherein the at least one page includes client user-viewable ads and an Internet connection confirmation widget, wherein when the widget is activated by the client user, the hosting server redirects the client computing device to a second URL;
an Internet connection management server located at the second URL, the Internet connection management server configured for:
serving one or more pages to the client computing device providing the following options: 1) a free session of access to the Internet, subsequent to receiving a confirmation from the client user regarding terms and conditions via the one or more pages, wherein the client user is not required to provide identifying information to gain the free session of access to the Internet, 2) a paid session of access to the Internet, subsequent to receiving electronic payment information of the client user via the one or more pages, and 3) a paid voucher session of access to the Internet, subsequent to receiving voucher information of the client user via the one or more pages, wherein the client user is not required to provide identifying information to gain the paid voucher session of access to the Internet;
granting access to the Internet to the client computing device, according to the option selected by the client user via the one or more pages; and
managing an amount of time the client computing device may access the Internet, according to the option selected by the client user.

2. The system of claim 1, wherein the step of the router configured for receiving a request further comprises receiving an HTTP request.

3. The system of claim 2, wherein the at least one page further includes a welcome message.

4. The system of claim 3, wherein the at least one page further includes a thank you message.

5. The system of claim 3, wherein the electronic payment information includes credit card information.

6. The system of claim 5, wherein the Internet connection management server is further configured for authenticating the client user.

7. The system of claim 6, wherein the Internet connection management server is further configured for authorizing the client user for use of the Internet connection granted to the client user.

8. The system of claim 1, wherein the client computing device is a smart phone.

9. The system of claim 1, wherein the client computing device is a laptop.

10. The system of claim 1, wherein the client computing device is a tablet computing device.

11. A system for monetizing an Internet connection, the system comprising:
a router and/or access points communicably coupled with the Internet, the router and/or access points configured for receiving a request from a client computing device to connect to the router and/or access points for Internet access, and redirecting the client computing device to a first Uniform Resource Locator (URL) via the Internet connection;
a hosting server located at the first URL, the hosting server configured for serving at least one page to the client computing device, wherein the at least one page includes client user-viewable ads and an Internet connection confirmation widget, wherein when the widget is activated by the client user, the hosting server redirects the client computing device to a second URL;
an Internet connection management server located at the second URL, the Internet connection management server configured for:
serving one or more pages to the client computing device providing the following options: 1) a free session of access to the Internet, subsequent to receiving a confirmation from the client user regarding terms and conditions via the one or more pages, wherein the client user is not required to provide identifying information to gain the free session of access to the Internet, 2) a paid session of access to the Internet, subsequent to receiving electronic payment information of the client user via the one or more pages, and 3) a paid voucher session of access to the Internet, subsequent to receiving voucher information of the client user via the one or more pages, wherein the client user is not required to provide identifying information to gain the paid voucher session of access to the Internet;
granting access to the Internet to the client computing device, according to the option selected by the client user via the one or more pages; and
managing an amount of time the client computing device may access the Internet, according to the option selected by the client user.

12. The system of claim 11, wherein the step of the router and/or access points configured for receiving a request further comprises receiving an HTTP request.

13. The system of claim 12, wherein the at least one page further includes a welcome message.

14. The system of claim 13, wherein the at least one page further includes a thank you message.

15. The system of claim 13, wherein the electronic payment information includes credit card information.

16. The system of claim 15, wherein the Internet connection management server is further configured for authenticating the client user.

17. The system of claim 16, wherein the Internet connection management server is further configured for authorizing the client user for use of the Internet connection granted to the client user.

18. The system of claim 11, wherein the client computing device is a smart phone.

19. The system of claim 11, wherein the client computing device is a laptop.

20. The system of claim 11, wherein the client computing device is a tablet computing device.

* * * * *